Patented Feb. 3, 1931

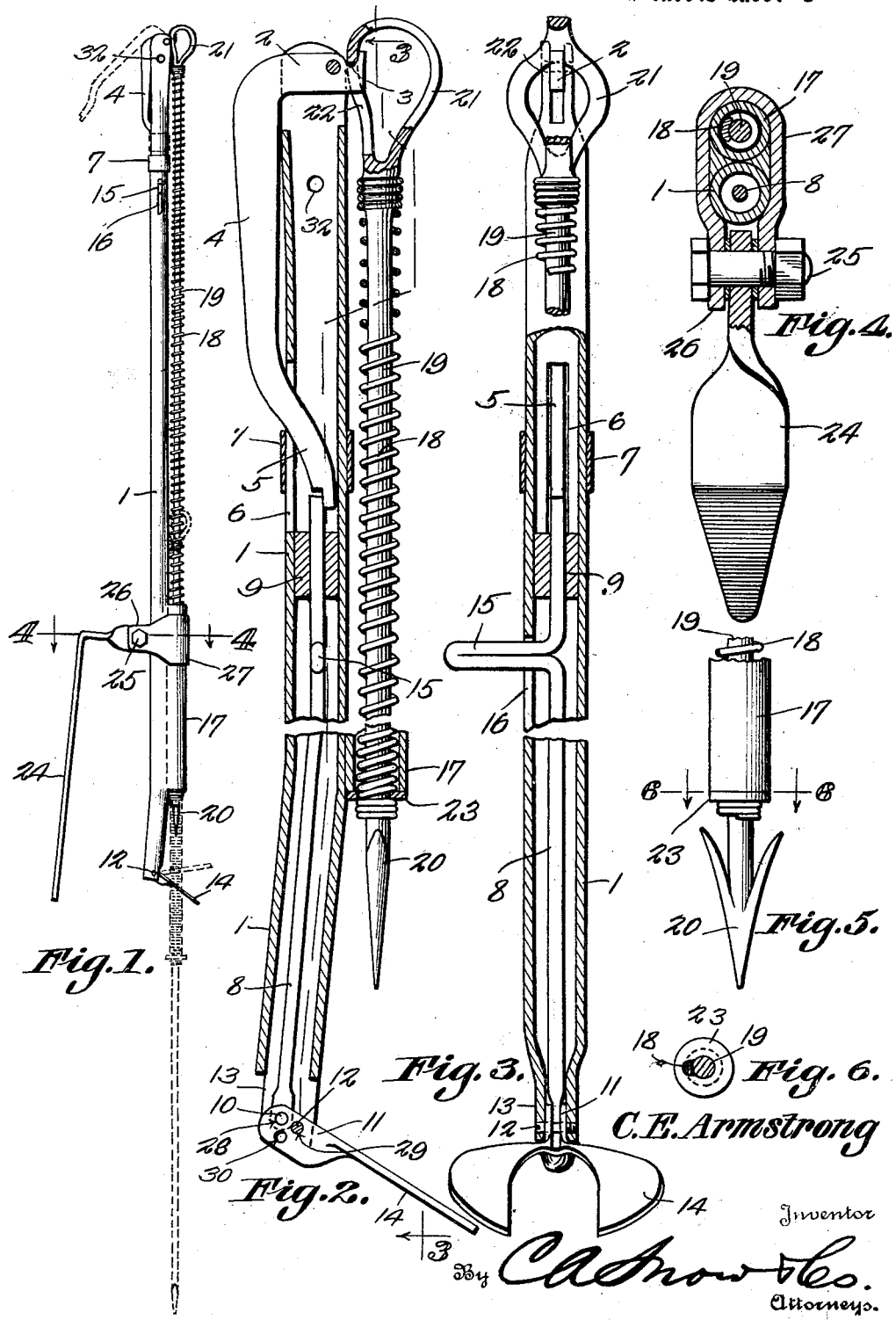

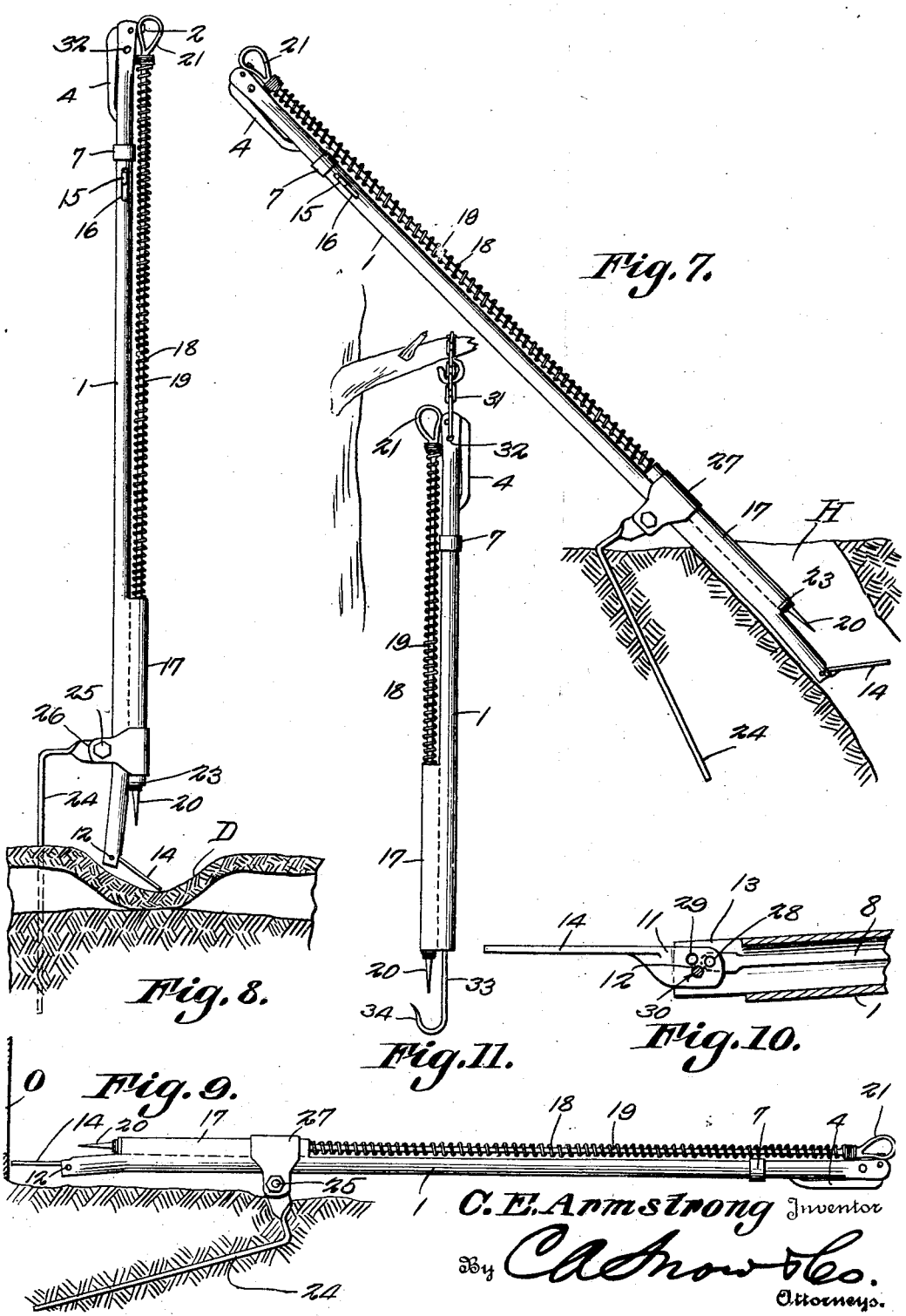

1,790,740

UNITED STATES PATENT OFFICE

CHARLES E. ARMSTRONG, OF OAKWOOD, OKLAHOMA

TRAP

Application filed October 20, 1928. Serial No. 313,839.

This invention relates to a trap designed primarily for use in killing gophers, moles, rats, and other rodents, although in larger sizes, it is also useful as a means for trapping larger animals such as coyotes.

It is an object of the present invention to provide a trap utilizing a spring actuated spear adapted to be released by a rodent or other animal, there being novel means for mounting the spring of the spear whereby injury to the spring or disconnection of any of the parts during the actuation of the spear is prevented.

Another object of the invention is to provide a simple and compact construction of trap which can be easily set and can be locked against accidental actuation while the set is being made.

A further object is to provide a trap of this character which can be set without the necessity of touching the trigger or that portion of the trap adjacent thereto.

A still further object is to provide a trap which can be converted readily for use in trapping many different kinds of animals.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred forms of the invention have been shown.

In said drawings,

Figure 1 is a side elevation of the trap, the position of the spear when set being shown by full line while the position thereof when released being shown by broken lines.

Figure 2 is a longitudinal section through the trap showing the same set, the middle portion of the trap being broken away and said trap being shown on an enlarged scale.

Figure 3 is a section on line 3—3, Figure 2.

Figure 4 is an enlarged section on line 4—4, Figure 1.

Figure 5 is an elevation of the head portion of the spear and adjacent parts.

Figure 6 is a section on line 6—6, Figure 5.

Figure 7 is an elevation of the trap positioned for trapping gophers.

Figure 8 is a similar view showing the trap positioned for catching moles.

Figure 9 shows the trap in elevation and arranged to catch rats.

Figure 10 is an enlarged section through a portion of the trap showing the position of the trigger when the trap is used as in Figure 9.

Figure 11 is an elevation of the trap suspended for use in catching larger animals such as coyotes.

Referring to the figures by characters of reference, 1 designates an elongated tubular shank constituting the body of the trap. In one end of this shank is pivoted a latch 2 having one terminal adapted to swing into and out of the shank, said terminal being formed with a notch 3. The other terminal of the latch has an arm 4 extending therefrom. The free end 5 of this arm is offset and adapted to swing into and out of a slot 6 formed in the shank 1. The parts are so proportioned that when the offset portion 5 is seated in the slot as shown in Figure 2 the notched terminal of latch 2 will be extended outwardly from the shank 1. Any suitable means, such as a slidable sleeve 7 can be mounted on the shank 1 for lapping the offset portion 5 and holding the latch against movement.

A tripping rod 8 is extended longitudinally within the shank 1. The inner end of this rod can be guided by a sleeve 9 seated in the shank. The other end of the rod is pivotally connected, as at 10 to a finger 11 fulcrumed on a pin 12 removably mounted in the adjacent end of shank 1 which is forked as shown at 13. A trigger plate 14 extends from the finger.

Rod 8 is adapted to be shifted toward the latch 2 by a finger 15 extending radially therefrom through a short slot 16 in shank 1. When the rod is thus shifted it will be brought into position where it will lap the end of the offset portion 5 as shown in Figure 2, the trigger 14 being at the same time held at an angle relative to the shank 1.

Mounted on the shank 1 is a tubular guide 17 and slidable in this guide is a coiled spring 18. This spring extends around the elongated stem 19 of a spear the head of which has been indicated at 20. A suitably shaped handle 21 is provided at that end of the stem remote from head 20 and has an opening 22 adapted to receive the notched terminal of the latch 2 so as thus to be held against longitudinal movement in one direction. One end of the coiled spring 18 is attached in any suitable manner to the stem 19 close to the handle 21. The other end portion of the spring is connected to a stop 23 in the form of a washer or the like slidably mounted on stem 19. The spear is so located that its longitudinal axis will intersect the trigger when the trap is set as shown in Figures 1 and 2.

For the purpose of supporting the trap upon the ground a stake 24 is connected thereto by a clamping bolt 25 extending through spaced ears 26. This stake is sufficiently long to enter the ground and hold the trap firmly at a desired angle. It might be added that the ears 26 are carried by a yoke 27 which is adjustable along the shank 1 and the tubular guide 17, it being held firmly thereto whenever the bolt 25 is tightened. Thus under some conditions the stake can be connected to the upper portion of the guide member 17 as shown in Figure 1 and, under other conditions, can be connected to the lower portion of the guide as shown in Figure 8.

The finger 11 extending from the trigger 14 has three openings therein indicated at 28, 29, and 30. These openings are disposed preferably at equal distances from each other as shown in Figure 2 and when the parts are arranged as indicated in said figure the opening 28 contains the pivot pin or stud indicated at 10 while the opening 29 contains the fulcrum pin 12.

When the trap is to be used for catching gophers, the several parts are arranged as shown in Figure 2 and the trap is set as shown in Figure 7. During the setting operation the stake 24 is forced into the ground close to the gopher hole H where the trigger 14 and the adjacent portion of the trap are supported as shown in said Figure 7. After the trap has been set in position the safety sleeve 7 is slid out of engagement with the arm of the latch and the trap is then ready for use. A gopher may spring the trap by touching the trigger 14 and pressing it slightly upward but usually does so by pressing earth against the trigger when endeavoring to stop up the hole H. A slight movement of the trigger when thus pressed will cause the rod 8 to pull out of engagement with the end of arm 4. Latch 2 is thus released and the tensioned spring 18 promptly propels the spear longitudinally so that the head thereof will penetrate the gopher and any earth in front of it. By mounting the spring as described the same will travel with the spear after the tension of the spring has been removed. Thus there is no danger of the spring being torn from its fastening means or in any way injured, as would be the case should it be fixedly attached to the guide. In other words, the stop washer 23 bears against but is not attached to the tubular guide 17 while the spring 18 is under tension. When the spear is released from the latch, however, the momentum thereof due to its actuation by the spring will result in the spear carrying the spring with it during the last portion of the movement thereof from the full line position shown in Figures 1 and 2 to the dotted line position shown in Figure 1.

When arranging the trap for catching moles, the said trap is set up at a point where a depression has been made in the dirt above the mole hole. Such a depression has been shown at D in Figure 8. The trigger 14 is in contact with the depressed portion. Thus when the mole attempts to thrust the depressed portion upwardly the trigger will be shifted and the trap released.

One way of arranging the trap for the purpose of catching rodents and more especially rats, has been indicated in Figures 9 and 10. When thus used the pivot pin 12 is removed from the opening 29 and placed in the opening 30. The trap is then arranged in a substantially horizontal position so that the trigger 14 will be supported close to the bottom of an opening O in a wall or the like through which the rodent is expected to pass. Thus when the rodent places its weight on the trigger 14 the same will be depressed and will actuate rod 8 to release the latch as will be apparent by referring to Figure 10.

While the trap is particularly useful for catching rodents, it can also be employed for catching larger animals such as coyotes. As shown in Figure 11 the trap can be suspended by a chain 31 or the like fastened in an opening 32 formed within the upper portion of the shank 1. The lower portion of the trap can be constructed the same as that already described in which event bait can be connected in any manner desired to the rod 8 after removal of pin 12 and trigger 14. If preferred, however, the trap can be made as illustrated in Figure 11 wherein that portion of the shank below the tubular guide 17 is cut off and the rod 8, extending as shown at 33, can be formed with a hook 34 for engaging and supporting bait. After the trap has been baited and set it can be suspended by the chain 31 from a low branch of a tree or the like and when an animal grabs the bait and pulls downwardly on it the arm 4 of latch 2 is of course released so that the spear will be actuated in the manner already described.

In all forms of the trap described the setting operation is the same. The user grasps the handle 21 and pulls the spear longitudinally. As washer 23 comes against the guide 17, this pulling action will result in stretching the spring. When the handle is brought opposite the latch 2 it is placed in engagement therewith, the arm 4 of the latch being at this time held against movement by sleeve 7.

What is claimed is:

1. A trap including a body, a spring actuated spear thereon, a trigger having a plurality of apertures, a pivot pin insertable into one of the apertures for connecting the trigger to the body, and means connected to the trigger at one of the other apertures for actuation by the trigger to release the spear.

2. A trap including a body, a spear movably connected thereto, a stop slidable on the spear, a tension spring attached at one end to the spear and at its other end to the stop, said spear, when moved in one direction relative to the body, constituting means for drawing the stop against the body and placing the spring under tension, means for holding the spear in position with the spring under tension, and a tripping element for releasing the spear.

3. A trap including a body, a spear movably connected thereto, a stop slidable on the spear, a tension spring attached at one end to the spear and at its other end to the stop, said spear, when moved in one direction relative to the body, constituting means for drawing the stop against the body and placing the spring under tension, means for holding the spear in position with the spring under tension, and a tripping element for releasing the spear, said stop and spring being movable bodily with the spear and relative to the body after the point of tension of the spring has been passed following the release of the spear.

4. A trap including a body, a spear movably connected thereto, a stop slidable on the spear, a tension spring attached at one end to the spear and at its other end to the stop, said spear, when moved in one direction relative to the body, constituting means for drawing the stop against the body and placing the spring under tension, means for holding the spear in position with the spring under tension, said means including a latch, a tripping rod for engaging the latch to hold it against movement, a finger outstanding from said rod adjacent to the latch, and a tripping element connected to the rod, said finger constituting means for actuating the rod to shift the tripping element to determine its freedom of movement after the trap has been set.

5. A trap including a body, a spring actuated spear thereon, a latch for holding the spear against movement by the spring, a slidable tripping rod within the body for holding the latch against movement, a trigger connected to the rod, and a finger extending from the rod for use in shifting the rod to determine the freedom of movement of the trigger when the trap is in set position and without touching the trigger with the hand of the user.

In testimony that I claim the foregoing as my own, I have hereto affixed my signature.

CHARLES E. ARMSTRONG.